United States Patent
Johnson

[11] Patent Number: 6,058,444
[45] Date of Patent: May 2, 2000

[54] SELF-TERMINATING ELECTRICAL SOCKET

[75] Inventor: Brian Johnson, Eagle, Id.

[73] Assignee: Micron Technology, Inc., Boise, Id.

[21] Appl. No.: 08/942,878

[22] Filed: Oct. 2, 1997

[51] Int. Cl.$^7$ .................................................. G06F 13/00
[52] U.S. Cl. .......................... 710/102; 326/30; 439/188
[58] Field of Search ................................. 395/282, 281; 326/30; 439/188; 710/129, 131, 101, 102

[56] References Cited

U.S. PATENT DOCUMENTS

| | | | |
|---|---|---|---|
| 3,435,293 | 3/1969 | Bodge | 317/31 |
| 4,318,052 | 3/1982 | Colles | 330/255 |
| 4,675,551 | 6/1987 | Stevenson et al. | 326/30 |
| 4,915,466 | 4/1990 | Sorensen et al. | 350/96.2 |
| 5,030,122 | 7/1991 | Birch et al. | 439/188 |
| 5,245,499 | 9/1993 | Senes | 361/56 |
| 5,257,157 | 10/1993 | Epstein | 361/111 |
| 5,301,081 | 4/1994 | Podell et al. | 361/56 |
| 5,434,516 | 7/1995 | Kosco | 326/30 |
| 5,521,528 | 5/1996 | Mammano et al. | 326/30 |
| 5,528,168 | 6/1996 | Kleveland | 326/30 |
| 5,530,623 | 6/1996 | Sanwo et al. | 361/788 |
| 5,546,017 | 8/1996 | Vitunic | 326/30 |
| 5,548,226 | 8/1996 | Takekuma et al. | 326/30 |
| 5,553,250 | 9/1996 | Miyagawa et al. | 395/309 |
| 5,578,940 | 11/1996 | Dillion et al. | 326/30 |
| 5,635,852 | 6/1997 | Wallace | 326/30 |
| 5,635,853 | 6/1997 | Kikinis | 326/30 |
| 5,706,447 | 1/1998 | Vivio | 710/129 |
| 5,920,266 | 7/1999 | Allgood et al. | 340/825.05 |

FOREIGN PATENT DOCUMENTS

| | | |
|---|---|---|
| 0571099 | 11/1993 | European Pat. Off. . |
| 7-261892 | 10/1995 | Japan .................................. G06F 3/00 |
| 93/20519 | 10/1993 | WIPO . |

OTHER PUBLICATIONS

"Active Terminators for CMOS Drivers", *IBM Technical Disclosure Bulletin*, pp. 1–3, (Sep. 1989).
"DRAM 1 Meg X 4 DRAM 5VEDO Page Mode", *Micron Technology, Inc. 1995 DRAM Data Book*, pp. 1–1 thru 1–30.
"Monolithic Terminating Resistor", *IBM Technical Disclosure Bulleetin*, vol. 32, No. 11, pp. 326–327, (Apr. 1990).

*Primary Examiner*—Xuan M. Thai
*Attorney, Agent, or Firm*—Schwegman, Lundberg, Woessner & Kluth, P.A.

[57] ABSTRACT

A self terminating electrical socket is described which adjusts communication line termination circuit characteristics in response to a mate engaging the socket. Electrical and mechanical detection techniques are described for switching the termination circuitry from a first state to a second state. The electrical socket is particularly well suited for use in a described memory bus. Multiple termination circuits are described which have different electrical characteristics depending upon the population of the electrical socket.

31 Claims, 6 Drawing Sheets

SELF-TERMINATING ELECTRICAL SOCKET

TECHNICAL FIELD OF THE INVENTION

The present invention relates generally to electrical sockets and in particular the present invention relates to sockets with automatic electrical termination.

BACKGROUND OF THE INVENTION

Personal computers, as shown in FIGS. 1 and 2, include a monitor 100, keyboard input 102 and a central processing unit 104. The processor unit typically includes a microprocessor 106, a memory bus circuit 108, and other peripheral circuitry 110. The memory bus is provided with a number of expansion sockets to allow the purchaser of the personal computer to install additional memory circuits as the user's needs change. A number of expansion sockets for memory upgrades typically exist along a memory bus. The expansion sockets remain empty unless the user decides to upgrade the system's memory by installing additional memory circuits.

In general, the characteristic impedance of the computer's memory bus interface is designed to match the impedance of a fully loaded memory bus. When the memory bus is fully loaded, therefore, the interface and the bus will be matched. The mismatch in impedance creates a ringing effect on the memory bus which results in overshoot and undershoot in a signal communicated over the bus. Such ringing has not created difficulty in communicating with typical memory circuits. This is due to the limited communication speeds of memory circuits used to-date. Memory circuits, however, are being designed which can operate at increasingly faster communication speeds.

Computers which have a memory bus and memory bus interface where the impedance therebetween is mismatched can experience errors in communication when fast data rate memory circuits are installed in a partially empty data bus. Further, as the population of a bus changes, the electrical Termination must change accordingly.

For the reasons stated above, and for other reasons stated below which will become apparent to those skilled in the art upon reading and understanding the present specification, there is a need in the art for an electrical socket which adjusts the electrical termination characteristics if the socket is populated.

SUMMARY OF THE INVENTION

The above mentioned problems with communication buses and other problems are addressed by the present invention and which will be understood by reading and studying the following specification. A self-terminating socket is described which detects when a mate is engaged with the socket and adjusts a termination circuit.

In particular, the present invention describes an electrical socket comprising an electrical connection for receiving an externally provided electrical signal, and a termination circuit coupled to the connection for terminating the electrical signal transmitted to the electrical connection. The termination circuit having a first set of electrical characteristics when the socket is not engaged with a mate, and a second set of electrical characteristics when the socket is engaged with a mate. The socket further includes a detector for detecting when a mate is engaged with the socket and providing an output signal to the termination circuit for selecting the first or second set of electrical characteristics.

In another embodiment, a memory bus comprises a plurality of sockets coupled to a data communication line, a plurality of detectors associated with the plurality of sockets each for providing an output indicating when the socket is engaged with a memory module, and a termination circuit coupled to the data communication line. The termination circuit having a plurality of electrical characteristic states selectable based upon the output from the detectors.

In yet another embodiment, a computer system comprises a processor, a memory bus having communication lines coupled between the processor and a plurality of sockets, each of the sockets adapted to receive a memory module, and a plurality of switch devices located in proximity to the sockets such that each one of the switches provides a signal indicating when one of the sockets is engaged with a memory module. The computer system also comprises a plurality of termination circuits. Each termination circuit coupled to a communication line and having multiple electrical characteristics which are selected in response to the signals provided by the plurality of switch devices.

Additionally a method of terminating a communication line coupled to multiple sockets is described. The method comprises the steps of coupling a termination circuit having a first set of electrical characteristics to the communication line, engaging a memory module with one of the multiple sockets, detecting when the memory module is engaged with the socket, and adjusting the termination circuit to have a second set of electrical characteristics in response to the step of detecting.

BRIEF DESCRIPTION OF THE DRAWINGS

FIG. 14b is a schematic diagram of a termination circuit with the socket of FIG. 14a;

DETAILED DESCRIPTION OF THE INVENTION

Figure 1:
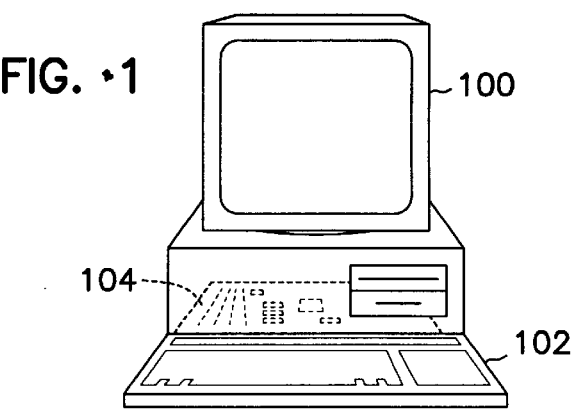
FIG. 1 illustrates a personal computer.
Figure 2:
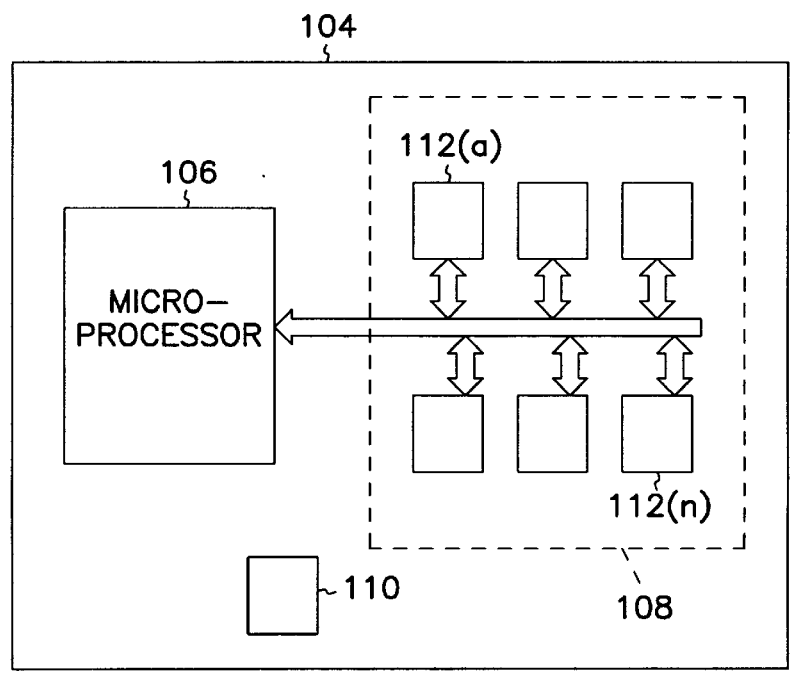
FIG. 2 is a block diagram of the CPU of FIG. 1.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

There are a number of integrated circuit memories commercially available. For example, dynamic memory circuits having memory cells arranged to be accessed in a random fashion are referred to as dynamic random access memories, DRAMs. These memories can be produced in a variety of designs which provide different methods of reading from and writing to the dynamic memory cells of the memory. One such method is page mode operation. Page mode operations in a DRAM are defined by the method of accessing a row of a memory cell array and randomly accessing different columns of the array. Data stored at the row and column intersection can be read and output while that column is accessed. Page mode DRAMs require access steps which limit the communication speed of the memory circuit. A typical communication speed using page mode DRAMs is approximately 33 MHz.

An alternate type of memory circuit is the extended data output (EDO) memory which allows data stored at a memory array address to be available as output after the addressed column has been closed. This memory circuit can increase some communication speeds by allowing shorter access signals without reducing the time in which memory output data is available on the memory bus. A more detailed description of a DRAM having EDO features is provided in the "1995 DRAM Data Book" pages 1-1 to 1-30 available from Micron Technology, Inc. Boise, Id., the assignee of the present application and is incorporated herein by reference.

Yet another type of memory circuit is a synchronous access memory which can receive one address of a memory array on external address lines and automatically address a sequence of columns manner without providing additional column addresses on the external address lines. These memory circuits are capable of outputting data at significantly faster communication rate than previous memory circuits.

As described above, a personal computer includes a microprocessor and a memory bus. The computer is usually sold by the manufacture with a partially full memory bus. This allows the purchaser of the computer to customize the computer to meet their personal needs. The memory bus interface is designed to have an impedance which matches a fully loaded memory bus. If the memory bus is only partially full, the memory bus and its interface will have a mismatched impedance. Mismatched impedances along a communication line, as known to one skilled in the art, result in signal ringing when a signal is transmitted on the communication line. The ringing is a result of signal "ghosts" which reflect or bounce along the communication line.

Figure 3:
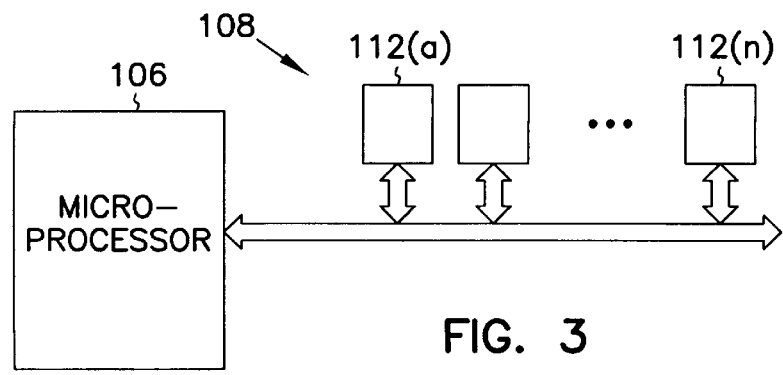
FIG. 3 is a memory bus of FIG. 2.

FIG. 3 illustrates a memory bus 108 where the memory socket 112(n) farthest from the interface with the microprocessor 106 does not contain an integrated memory circuit. When a signal is communicated by the microprocessor to the memory bus, signal reflection can occur. As known to one skilled in the art, the reflection created by an open, or unterminated, bus is maximized. Further, because the interface between the microprocessor and the bus is mismatched, a signal reflected by the end of the bus will be partially reflected back down the bus by the interface.

Figure 4:
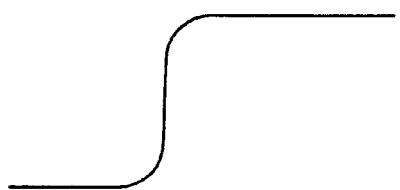
FIG. 4 is an ideal step function signal.
Figure 5:
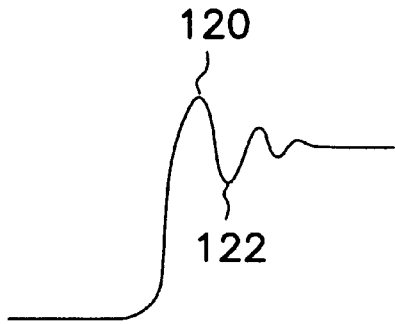
FIG. 5 is a step function signal with ringing.

An ideal step function signal, low to high signal transition, communicated by the microprocessor to a memory bus line is shown in FIG. 4. The signal transitions to a high state with little or no fluctuation in the signal. FIG. 5 shows a step signal which results from ringing in a communication line. The signal experiences both overshoot and undershoot of the desired final signal level. In a worst case situation where the communication line is open and has a high impedance mismatch the overshoot 120 and undershoot 122 can be 50% to 100% of the final signal level. The signal ringing is a damped function, such that the ringing decreases in amplitude over time.

Figure 6:
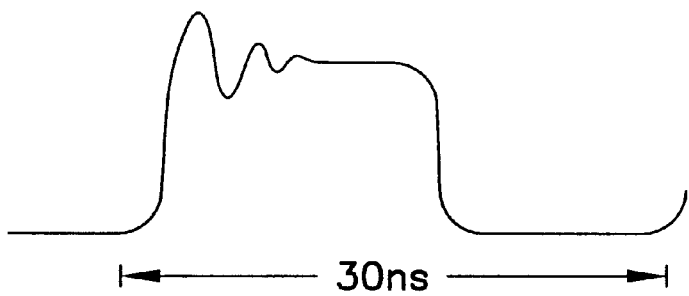
FIG. 6 is a 33 MHz signal pulse on a computer memory bus.
Figure 7:
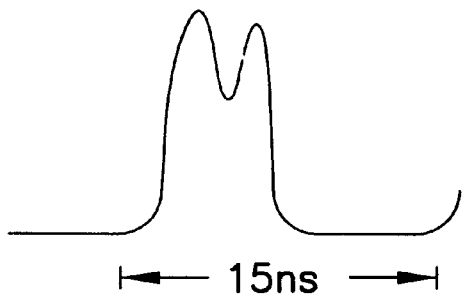
FIG. 7 is a 66 MHz signal pulse on a computer memory bus.

To appreciate the problems which ringing can create in a memory bus consider the length of a typical signal in a system using 33 MHz memories. The period or signal length would be 30 ns and the ringing incurred would be approximately 3–5 ns for a 2 cm bus. FIG. 6 illustrates one positive pulse signal in such a system. The 10 ns of stable signal (15 ns–5 ns) is adequate time for the signal to be correctly communicated to a memory connected to the bus. If the communication frequency is increased to 66 MHz, the period is decreased to 15 ns, FIG. 7. Assuming 5 ns of ringing, the stable signal length is reduced to 2.5 ns. It can be appreciated that errors in communication can occur as the amount of stable signal is reduced.

It will be appreciated that as the population of the memory bus changes, the impedance mis-match also changes. To eliminate this problem, a user can manually change the termination of the memory bus. This procedure, however, depends upon human actions to change termination components. The present invention addresses this problem by providing an electrical socket which automatically modifies its termination characteristics based upon the bus population.

Figure 8:
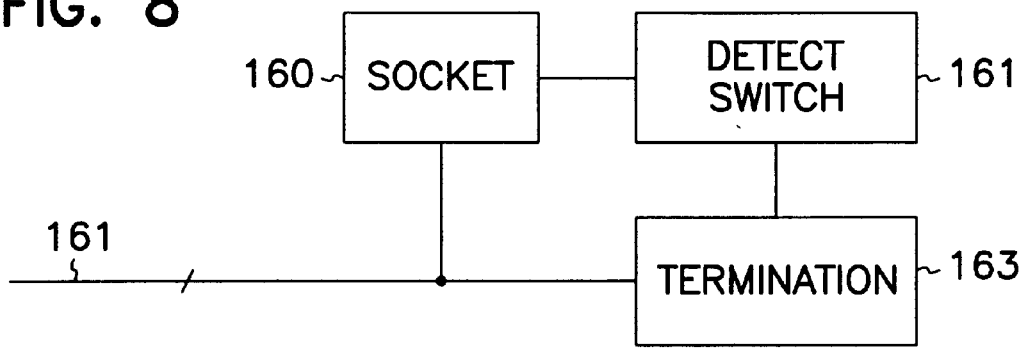
FIG. 8 is a block diagram of a self terminating socket of the present invention.

Referring to FIG. 8, one example of a self-terminating socket 160 is described. The socket is provided in a bus 161 and has an associated switch 140 and termination circuit 163. The switch, or detector, can be either mechanically or electrically controlled in response to an intended mate being engaged with the socket. The termination circuitry can be any known electrical termination, including but not limited to resistors and/or diodes. The detector provides an output signal indicating when a mate is engaged with the socket.

Figure 9:
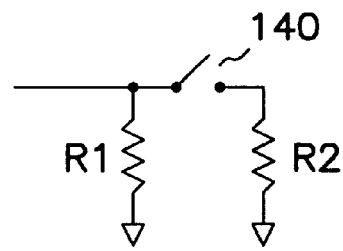
FIG. 9 is a schematic diagram of a parallel termination circuit.
Figure 10:
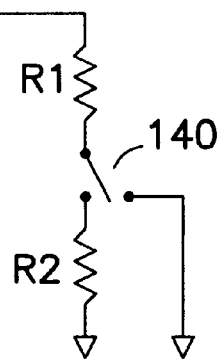
FIG. 10 is a schematic diagram of a series termination circuit.

FIGS. 9 and 10 illustrate two possible resistive termination circuits which can be varied by changing the population of a bus. The circuits include multiple resistors $R_1$ and $R_2$. In FIG. 9, the $R_1$ resistor is always coupled between or bus connection and a reference voltage (ground). When the socket is empty, switch 140 is closed and resistor $R_2$ is coupled in parallel to $R_1$. As such, the total resistance of the bus termination is $R_{Total}=(R_1+R_2)/2$ when the socket is empty and $R_{Total}=R_1$ when the socket is populated. Alternately, FIG. 10 illustrates a termination circuit where $R_1$ is coupled directly to ground when the socket is populated. Resistors $R_1$ and $R_2$ are coupled in series when the socket is unpopulated and switch 140 is closed. Thus, the total termination resistance for a populated socket is $R_{Total}=R_1$, and for an empty socket $R_{Total}=R_1+R_2$. Other termination circuits are contemplated including diodes, capacitors, inductors, resistor, and combinations of these devices. For simplicity, however, the termination circuitry is illustrated generally as resistors.

The switch 140 can be either mechanically or electrically operated in response to a mate of the socket. For example, a small contact switch can be provided to detect when the socket is populated. The switch is used with the termination circuits described above. Alternately, a mate, or memory module, inserted in the socket can be used to make or break an electrical connection. These electrical and mechanical elements can be combined to provide a switching operation. For example, a transistor could be used which is activated by a gate signal from a mechanical device. Also, a multiplex circuit could be used. See FIGS. 11–13 for some embodiments of other self terminating circuits.

Figure 11:
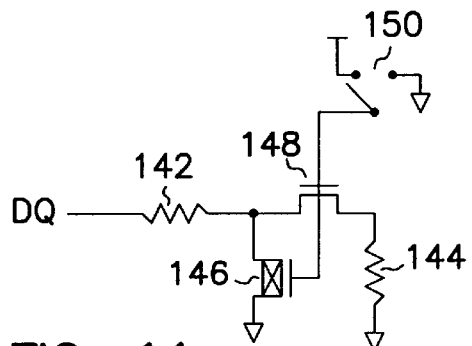
FIG. 11 is a schematic diagram of a series termination circuit using transistors.
Figure 12:
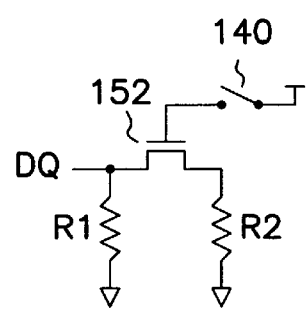
FIG. 12 is a schematic diagram of a parallel termination circuit using transistors.
Figure 13:
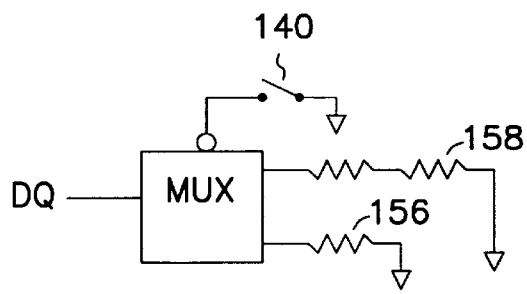
FIG. 13 is a schematic diagram of a termination circuit having a multiplex circuit.

FIG. 11 illustrates an adjustable termination circuit which includes series resistors 142 and 144 which can be coupled or decoupled between a data line, DQ, and ground through transistors 146 and 148. The transistors are controlled via double pole switch 150. FIG. 12 illustrates a parallel resistive termination responding to switch 140 and transistor 152. In another embodiment, FIG. 13 illustrates a termination circuit including a multiplex circuit 154 for coupling the DQ line to one of two resistor paths 156 or 158 in response to switch 140.

Figure 14A:
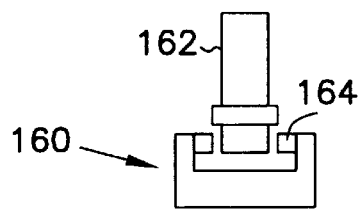
FIG. 14a is a diagram of a socket for receiving a mate to close a circuit connection.
Figure 14B:
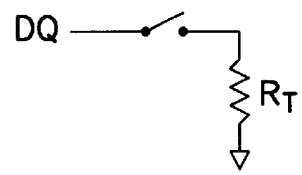

FIG. 14a illustrates a socket 160 of the present invention for receiving a module 162. The socket includes electrical contacts 164 which are not coupled together when the socket is unpopulated. Thus, the circuit is normally illustrated as shown in FIG. 14b and couples termination circuit generally shown as component Rt. When a module is mounted in the socket, a conductor provided on the module electrically couples the two contacts. Thus, a switching mechanism is provided to indicate when a socket is populated.

Figure 15:
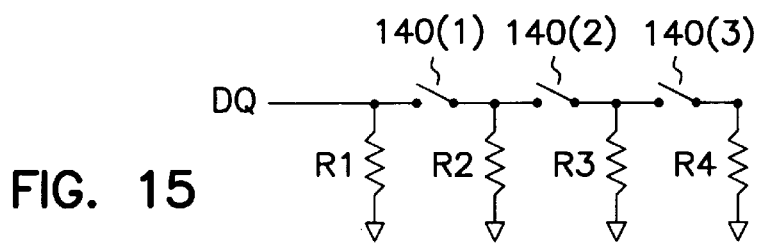
FIG. 15 is a schematic diagram of another termination circuit having multiple detectors.

FIG. 15 illustrates a bus having three sockets and corresponding detectors 140. When a mate is engaged with one of the sockets, the termination characteristics are changed. It will be appreciated that the mates are engaged in sequential order from 140(1) to 140(3).

Figure 16:
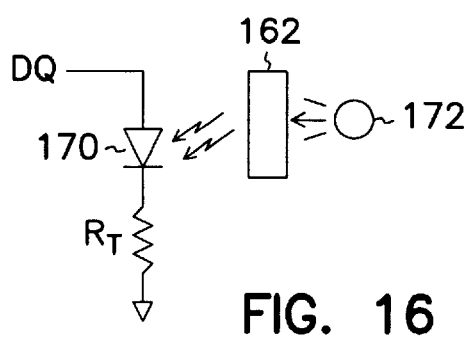
FIG. 16 is a schematic diagram of a termination circuit having a photo diode.
Figure 17:
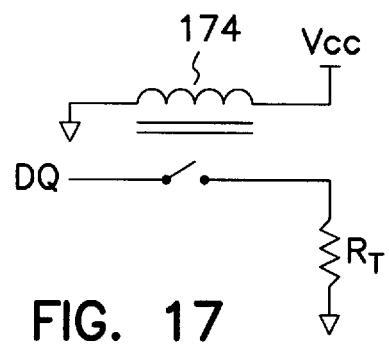
FIG. 17 is a schematic diagram of a termination circuit having a relay.

FIG. 16 illustrates an electrical detection device which includes a photo diode 170 and a light source 172. When a module 162 is inserted into a socket, the light is blocked from the diode to interrupt connection to termination circuitry Rt. Referring to FIG. 17, a detector is illustrated as having a relay which is coupled to $V_{cc}$ through an engaged module. Thus, when a module is inserted into a socket, current flows through the relay to open a connection to termination circuitry.

Figure 18:
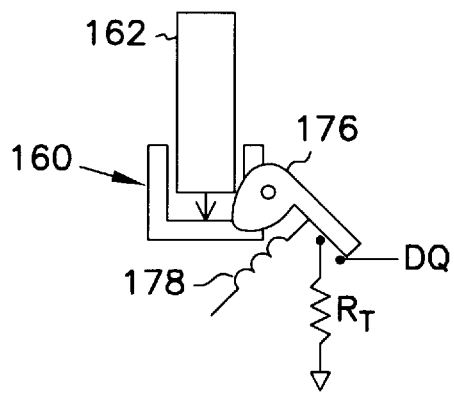
FIG. 18 is a diagram of a termination circuit and socket using a cam.

A mechanical cam 176 is shown in FIG. 18 as providing a conductive path between a DQ line and Rt. The cam is spring 178 loaded to have a normally closed position. When module 162 is inserted into socket 160, the cam is physically moved and the electrical contact is opened.

Figure 19:
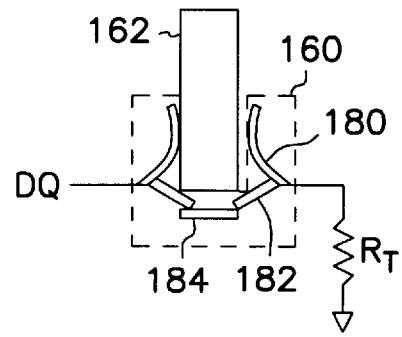
FIG. 19 is a diagram of another socket for receiving a mate to connect contact fingers.
Figure 20A:
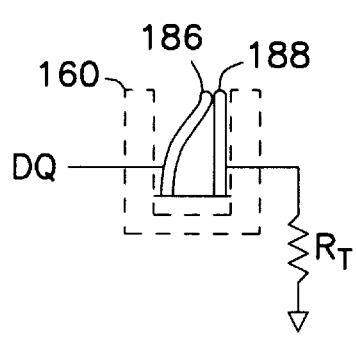
FIG. 20a is a diagram of a socket for receiving a mate and having normally closed contacts.
Figure 20B:
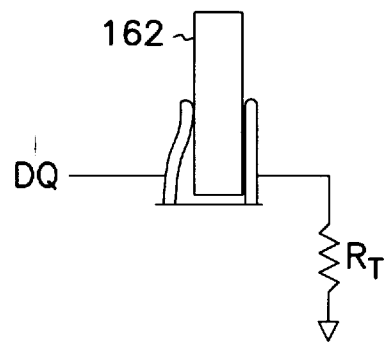
FIG. 20b is a diagram of the socket of FIG. 20a engaging a mate.
Figure 21:
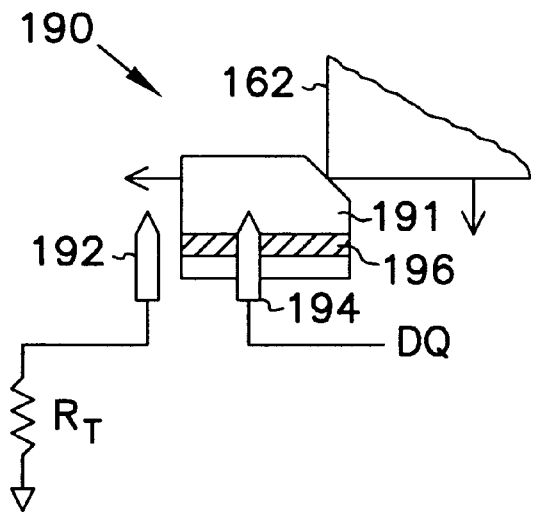
FIG. 21 is a diagram of a normally open sliding mechanical switch device.
Figure 22:
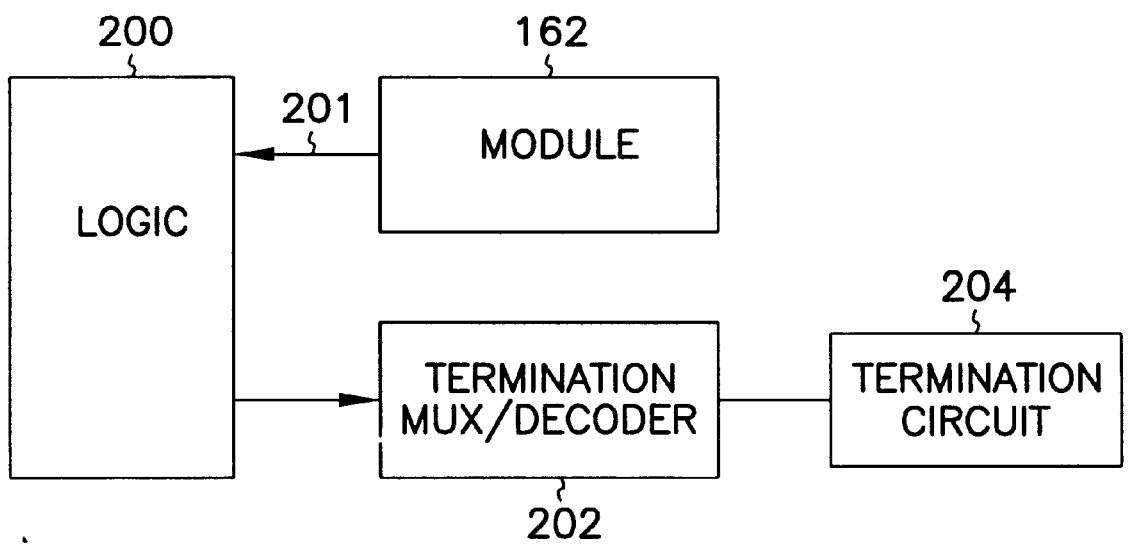
FIG. 22 is a block diagram of a termination device using module outputs.

Two additional mechanical embodiments are illustrated in FIGS. 19 and 20. FIG. 19 shows a socket 160 having module fingers 180 which are deflected when a module 162 is engaged with the socket. The fingers are conductive and are arranged such that a path is provided from DQ to Rt through conductor 184 and a part of the fingers 182. Again, this embodiment provides a normally open switch function. A similar socket which provides a normally closed function is shown in FIGS. 20a and 20b. Fingers 186 and 188 provide a path from DQ to Rt when the socket is empty. When the socket is populated, FIG. 20b, the conductive path is open. In another embodiment, a sliding detector 190 is provided which includes contacts 192 and 194. A slider 191 has a conductive strip 196 which will connect the contacts as a module 162 is inserted into a socket. This embodiment can easily be implemented as a normally closed device. An electrical embodiment is illustrated generally in FIG. 22 for adjusting the characteristics of termination circuitry 204. This embodiment uses an output signal 201 from the module 162, such as a presence detect signal. The signal is processed by logic circuit 200. The logic circuit can be part of a microprocessor. The logic circuit 200 controls termination multiplex/decode circuitry 202 to adjust circuit 204. Thus, the module is used to control the termination characteristics by processing existing module outputs. This embodiment has the advantage of reducing mechanical parts, and the reliability problems which may be associated therewith.

CONCLUSION

A system has been described which includes electrical sockets coupled to communication lines. The system includes termination circuitry which can be modified to have different electrical characteristics dependent upon the population of the sockets. Multiple detection techniques are described, including electrical and mechanical switching devices. The termination circuitry can be any suitable configuration, including resistors, capacitors, diodes, inductors or other circuits. The detection techniques described include one embodiment having a cam located with each socket.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An electrical socket comprising:
    an electrical connection for receiving an externally provided electrical signal;
    a termination circuit coupled to the connection for terminating the electrical signal transmitted to the electrical connection, the termination circuit having a first set of electrical characteristics when the socket is not engaged with a mate, and a second set of electrical characteristics when the socket is engaged with a mate; and
    a detector for detecting when a mate is engaged with the socket and providing an output signal to the termination circuit for selecting the first or second set of electrical characteristics.

2. The electrical socket of claim 1 wherein the detector is a switch activated by the mate.

3. The electrical socket of claim 2 wherein the switch has contacts which are closed when the socket is empty, and are open when the socket is engaged with the mate.

4. The electrical socket of claim 2 wherein the switch has contacts which are open when the socket is empty, and are closed when the socket is engaged with the mate.

5. The electrical socket of claim 2 wherein the switch comprises a relay.

6. An electrical socket comprising:

an electrical connection for receiving an externally provided electrical signal;

a termination circuit coupled to the connection for terminating the electrical signal transmitted to the electrical connection, the termination circuit having a first set of electrical characteristics when the socket is not engaged with a mate, and a second set of electrical characteristics when the socket is engaged with a mate;

a switch activated by the mate for detecting when a mate is engaged with the socket and providing an output signal to the termination circuit for selecting the first or second set of electrical characteristics, wherein the switch comprises a cam located to contact the mate when the socket is engaged with a mate.

7. An electrical socket comprising:

an electrical connection for receiving an externally provided electrical signal;

a termination circuit coupled to the connection for terminating the electrical signal transmitted to the electrical connection, the termination circuit having a first set of electrical characteristics when the socket is not engaged with a mate, and a second set of electrical characteristics when the socket is engaged with a mate;

a switch activated by the mate for detecting when a mate is engaged with the socket and providing an output signal to the termination circuit for selecting the first or second set of electrical characteristics, wherein the switch comprises a photo diode and a light source positioned such that light from the light source is prevented from reaching the photo diode when the socket is engaged with a mate.

8. A memory bus comprising:

a plurality of sockets coupled to a data communication line;

a plurality of detectors associated with the plurality of sockets, each of the plurality of detectors provides an output indicating when an associated one of the plurality of sockets is engaged with a memory module; and a termination circuit coupled to the data communication line, the termination circuit having a plurality of electrical characteristic states selectable based upon the outputs from the plurality of detectors.

9. The memory bus of claim 8 wherein the plurality of detectors comprise relays.

10. The memory bus of claim 8 wherein the plurality of detectors comprise logic circuitry for receiving a signal provided from the memory module.

11. The memory bus of claim 8 wherein the plurality of detectors comprise photo diodes and light sources positioned such that light from the light sources is prevented from reaching the photo diodes when the plurality of sockets are engaged with mates.

12. The memory bus of claim 8 wherein the detectors comprise a multiplex circuit for selecting one of the plurality of electrical characteristic states.

13. The memory bus of claim 8 wherein the detectors comprise a switch activated by the memory module.

14. The memory bus of claim 13 further comprising a transistor activated by the switch to select one of the plurality of electrical characteristic states.

15. The memory bus of claim 13 wherein the switch is a mechanical switch activated by engaging the memory module with a socket.

16. The memory bus of claim 15 wherein the switch comprises first and second electrical contacts which are positioned such that they are in contact to form an electrical path when a memory module is not engaged with the socket, and are not in contact to form the electrical path when the memory module is engaged with the socket.

17. The memory bus of claim 15 wherein the switch comprises first and second electrical contact fingers which are positioned such that they are in contact to form an electrical path when a memory module is not engaged with the socket, and are not in contact to form the electrical path when the memory module is engaged with the socket.

18. The memory bus of claim 15 wherein the switch comprises a cam located to contact the memory module when the socket is engaged with the memory module.

19. The memory bus of claim 15 wherein the switch comprises first and second electrical contacts which are positioned such that they are not in contact when a memory module is not engaged with the socket, and are coupled together through a conductor provided on the memory module to form an electrical path when a memory module is engaged with the socket.

20. A computer system comprising:

a processor;

a memory bus having communication lines coupled between the processor and a plurality of sockets, each of the sockets adapted to receive a memory module;

a plurality of switch devices located in proximity to the sockets such that each one of the switches provides a signal indicating when one of the sockets is engaged with a memory module; and a plurality of termination circuits, each termination circuit coupled to a communication line and having multiple electrical characteristics which are selected in response to the signals provided by the plurality of switch devices.

21. The computer system of claim 20 wherein the switch devices are activated by the memory module to physically interrupt an electrical connection through the switch.

22. The computer system of claim 20 wherein the switch devices are activated by the memory module to electrically interrupt an electrical connection through the switch.

23. The computer system of claim 20 wherein the plurality of termination circuits comprise resistors.

24. A method of terminating a communication line coupled to multiple sockets, the method comprising:

coupling a termination circuit having a first set of electrical characteristics to the communication line;

engaging a memory module with one of the multiple sockets;

detecting when the memory module is engaged with the one of the multiple sockets; and adjusting the termination circuit to have a second set of electrical characteristics in response to the step of detecting.

25. The method of claim 24 wherein detecting comprises interrupting electrical contacts with the memory module.

26. The method of claim 24 wherein detecting comprises coupling electrical contacts with the memory module.

27. The method of claim 24 wherein detecting comprises receiving a signal from the memory module.

28. The method of claim 24 wherein detecting comprises interrupting a light source with the memory module.

29. The method of claim 24 wherein adjusting the termination circuit comprises coupling an additional electrical components to the communication line.

30. The method of claim 24 wherein adjusting the termination circuit comprises decoupling an electrical component from the communication line.

31. The method of claim 24 wherein adjusting the termination circuit comprises controlling a multiplex circuit.

* * * * *